United States Patent Office 3,264,221
Patented August 2, 1966

3,264,221
CHEMILUMINESCENCE
Hilmer E. Winberg, Wilmington, Del., assignor to E. I. du Pont de Nemours and Company, Wilmington, Del., a corporation of Delaware
No Drawing. Filed July 11, 1960, Ser. No. 41,756
9 Claims. (Cl. 252—188.3)

This invention relates to, and has as its principal objects provision of, new formulations containing tetrakis-(dimethylamino)ethylene, referred to hereinafter for convenience as TMAE, and improved sources of chemical light based thereon.

Pruett et al., J. Am. Chem. Soc. 72, 3646 (1950), report the synthesis of TMAE from chlorotrifluoroethylene and dimethylamine and note that it chemiluminesces in air. This report is true, but the chemiluminescence is of relatively low intensity and of such duration as to be of no practical significance.

A careful study of the chemiluminescent oxidation of TMAE has now shown the reaction products contain at least formaldehyde, dimethylamine, N,N,N',N'-tetramethylurea, and N,N,N',N'-tetramethyloxamide. Surprisingly, it has now been found that these latter two compounds are extremely effective agents in quenching the chemiluminescence, i.e., in stopping the evolution of light during oxidation of TMAE. It has now been further found that formulations comprising TMAE, an oxidizing agent therefor, and a liquid which is immiscible with said TMAE but which is a solvent for at least the tetramethylurea and tetramethyloxamide degradation products afford vastly improved chemical light sources. Thus, by handling such formulations so as to maintain intimate contact of the TMAE under oxidizing conditions with the said liquid, whereby the said quenching oxidation products are continually removed, the chemiluminescence is dramatically increased in the range 20 to 45 fold.

The following examples are submitted to illustrate the invention further but not to limit it.

EXAMPLE I

Air oxidation of TMAE

Dry air was bubbled slowly into 20 parts of TMAE with stirring. The TMAE which was initially yellow luminesced strongly, but the luminescence gradually became weak and the liquid became tan. After 20 hours under these conditions, no more oxygen was absorbed and the reaction mixture was light lemon yellow in color and contained a small amount of undissolved solid. Both formaldehyde and dimethylamine were detected in the exit gases from the reactor. Upon distillation of the reaction residue there was obtained 13.3 parts (1.14 molar equivalents based on the TMAE charged) of tetramethylurea as a liquid boiling at 57–61° C. under a pressure corresponding to 10 mm. of mercury. The dark, oily, pot residue solidified on cooling. Upon recrystallization from diethyl ether with the aid of decolorizing charcoal, there was obtained 3.24 parts (0.24 molar proportion based on the TMAE) of tetramethyloxamide as a white solid melting at 79–80° C.

Similar experiments using in place of the air: oxygen, a 1:6 by volume mixture of oxygen and nitrogen, and finally oxygen with the TMAE dissolved in n-pentane, gave the same products with no significant change in the molar proportions of the tetramethylurea and tetramethyloxamide based on the TMAE charged. However, the amounts of light emitted varied. Thus, with air and the oxygen/nitrogen mixture there was some. With oxygen there was very little, and with oxygen and pentane there was none.

EXAMPLE II

A sample of TMAE luminescing in air was completely quenched by the addition of as little as one to two percent of tetramethylurea or tetramethyloxamide based on TMAE. When 25 percent or more of water based on TMAE was added to each of these quenched mixtures with shaking, the luminescence was regenerated. Similar results were obtained with ethylene glycol, 1,5-pentanediol, diethanolamine, and the like.

EXAMPLE III

Mixtures of TMAE (one part by volume in each instance) and the indicated solvents in the following table in the proportions there given were charged into low cylindrical containers which were silvered on the outside but open to the atmosphere. Stirring means was provided by an internal polytetrafluoroethylene-coated iron rod and an external rotating magnetic stirring apparatus controlled by a constant voltage transformer. Light measurements were obtained using an integrating visible light meter, Model 1501A, supplied by General Radio Corporation, Cambridge 39, Massachusetts, mounted on an adjustable jack above the luminescing surface so that the distance from the sensing element and the luminescing surface was controllable to a constant value. The entire apparatus was shielded from stray light leakage.

The light outputs obtained when the mixtures were stirred in air are given by the following table:

| Run No. | Solvent | Parts by Volume | Light Output in Lumen Sec./ft.$^2$/ Parts by Volume |
|---|---|---|---|
| 1 | Water | 10 | 21.3×10$^3$ |
| 2 | do | 15 | 21.1×10$^3$ |
| 3 | Ethylene glycol | 20 | 22.1×10$^3$ |
| 4 | None, control | | 0.5×10$^3$ |
| 5 | Ethylene glycol | 10 | 18.1×10$^3$ |
| 6 | do | 5 | 18.3×10$^3$ |
| 7 | do | 2 | 17.6×10$^3$ |
| 8 | Monomethyl ether of ethylene glycol | 10 | 12.2×10$^3$ |
| 9 | Diethanolamine | 10 | 19.2×10$^3$ |
| 10 | None, control | | 0.5×10$^3$ |

EXAMPLE IV

In a closed reactor a small sample of TMAE was exposed to pure oxygen. Under these conditions the TMAE, which prior to the admission of the oxygen had been exposed to air and was, therefore, luminescing, was rapidly quenched as the oxygen displaced the surrounding air atmosphere until at the equilibrium condition the luminescence was very low. Water was then admitted to the system and the quenched TMAE rapidly luminesced with a remarkable brightness which continued.

From the foregoing, it is apparent that the present invention is generic to an improvement in the process of generating visible light by the chemiluminescence of TMAE under oxidizing conditions, which improvement comprises maintaining intimate contact of the TMAE under said oxidizing conditions with a liquid which is immiscible with TMAE but which is a solvent for at least the degradation products tetramethylurea and tetramethyloxamide arising from oxidation of the said TMAE whereby the said oxidation products are continually removed and the chemiluminescence is markedly increased. The TMAE does not have to be present in the luminescing formulations per se. It can be present in solution in suitable organic solvents. For instance the TMAE can be dissolved in dioxane and on addition of a suitable solvent for the degradation products e.g., water, with shaking, markedly improved chemiluminescence is obtained. This extraction can be done in a continuous manner.

The required oxidizing conditions can be obtained by using oxygen, air, mixtures of air, and/or oxygen with other suitable diluent gases, e.g., nitrogen, or from the use of peroxides, both organic and inorganic, the most convenient of which are probably aqueous solutions of hydrogen peroxide. Suitable stable peroxides can be used instead and triggered by the addition of suitable chemical reactants or by heating the systems to the decomposition point of the stable peroxide.

The optimum concentration for hydrogen peroxide is around 3–5%. Higher concentrations give less light and more heat. The optimum concentration of oxygen is about that of air (~20%). The optimum temperature is around 25° C. or below. Higher temperatures shift the wave length of emitted light so that not as much visible light is emitted.

The temperature employed in the present invention is not critical and can vary widely, e.g., from −7° C. (the freezing point of TMAE) up to 50° C. or even higher subject to the variation in the wave length of emitted light (see immediately preceding paragraph).

Pressure is also a noncritical variable and can range widely, e.g., from 0.1 to 10 atmospheres. It may be noted that the only really relevant pressure is the partial pressure of oxygen in the atmosphere within which TMAE is chemiluminescent. The optimum partial pressure of oxygen seems to be about 20%. The foregoing statements regarding pressure are, of course, pertinent only to conditions wherein a gaseous atmosphere is employed. When the necessary oxidizing conditions are supplied in an aqueous system, e.g., with $H_2O_2$, total pressure is completely immaterial.

The suitable immiscible liquid solvents, i.e., immiscible with TMAE, which are solvents for at least the degradation products tetramethylurea and tetramethyloxamide include water and organic materials of relatively low viscosity, generally miscible with water, which have a plurality of hydroxyl groups per molecule but no more than two on contiguous carbons such as the glycols and substituted glycols, e.g., ethylene glycol, propylene glycol, pentamethylene glycol, and the like; amines carrying a plurality of hydroxy substituents, such as N-methyldiethanolamine, diethanolamine, triethanolamine, 2-amino-1,3-dihydroxy-2-ethylpropane, 3-amino-1-propanol, and the like. Diamines, such as ethylene diamine, can also be used but tend to dissolve some or all of the TMAE so the light yield is markedly reduced or is zero in those instances where solution is attained. For obvious reasons of cost and availability water is preferred.

These formulations of TMAE and suitable liquid solvents for the oxidation products of the chemiluminescent reaction, along with a source of the necessary oxygen or comparable oxidizing conditions, have obvious utility in flares for night-time signalling and particularly in providing useful distress or warning signals operable both in the air when constructed in self-contained assemblies providing the necessary solvent, but more importantly in water in view of the high utility of water as an activating solvent. Such flares are accordingly particularly useful as shipboard equipment for liferafts, lifeboats, and the like. They are also equally useful in individual applications serving as a source of light on immersion, thereby assisting recovery of men lost at sea. In another related but still different application which does not involve the formulations per se, the particular phenomenon of the marked activating of the chemiluminescence of quenched TMAE has significant utility in serving as an indicator of the presence of water. Thus, oxidation-quenched TMAE in water-permeable containers placed in the holds of ships or in dark places in underground areas would promptly serve through the bright chemiluminescence thereof to show the leakage of water into such areas. These flares are also convenient for illuminating areas on roadways during temporary emergency conditions such as automobile accidents or other obstruction to traffic.

Since obvious modifications and equivalents in the invention will be evident to those skilled in the chemical arts, I propose to be bound solely by the appended claims.

The embodiments of the invention in which an exclusive property or privilege is claimed are defined as follows:

1. A chemiluminescent composition consisting essentially of tetrakis(dimethylamino)ethylene, an oxidizing agent for the same selected from the group consisting of oxygen and peroxides, and a liquid which is immiscible with tetrakis(dimethylamino)ethylene but which is a solvent for tetramethylurea and tetramethyloxamide.

2. A chemiluminescent composition consisting essentially of tetrakis(dimethylamino)ethylene, an oxidizing agent for the same selected from the group consisting of oxygen and peroxides, and a member of the group consisting of water, ethylene glycol, propylene glycol, pentamethylene glycol, diethanolamine, N-methyldiethanolamine, triethanolamine, 2-amino-1,3-dihydroxy-2-ethylpropane, 3-amino-1-propanol, ethylenediamine and the monomethyl ether of ethylene glycol.

3. The chemiluminescent composition of claim 2 wherein the oxidizing agent is oxygen supplied by air.

4. A chemiluminescent composition consisting essentially of tetrakis(dimethylamino)ethylene, hydrogen peroxide and water.

5. The process of generating visible light which comprises contacting tetrakis(dimethylamino)ethylene with an oxidizing agent selected from the group consisting of oxygen and peroxides in the presence of a liquid which is immiscible with tetrakis(dimethylamino)ethylene but which is a solvent for the reaction products tetramethylurea and tetramethyloxamide and thereby dissolving the reaction products.

6. The process of generating visible light which comprises contacting tetrakis(dimethylamino)ethylene with an oxidizing agent selected from the group consisting of oxygen and peroxides the presence of water and thereby dissolving the reaction products tetramethylurea and tetramethyloxamide.

7. The process of generating visible light which comprises contacting tetrakis(dimethylamino)ethylene with an oxidizing agent selected from the group consisting of oxygen and peroxides in the presence of ethylene glycol and thereby dissolving the reaction products tetramethylurea and tetramethyloxamide.

8. The process of generating visible light which comprises contacting tetrakis(dimethylamino)ethylene with an oxidizing agent selected from the group consisting of oxygen and peroxides in the presence of diethanolamine and thereby dissolving the reaction products tetramethylurea and tetramethyloxamide.

9. The process of generating visible light which comprises contacting tetrakis(dimethylamino)ethylene with an oxidizing agent selected from the group consisting of oxygen and peroxides in the presence of the monomethyl ether of ethylene glycol and thereby dissolving the reaction products tetramethylurea and tetramethyloxamide.

References Cited by the Examiner

Pruett et al.: Journal of the American Chemical Society, 72, pp. 3646–3649 (1950).

TOBIAS E. LEVOW, *Primary Examiner.*

JOSEPH R. LIBERMAN, JULIUS GREENWALD,
*Examiners.*

R. D. EDMONDS, *Assistant Examiner.*